US006629726B2

(12) United States Patent
Johnston

(10) Patent No.: US 6,629,726 B2
(45) Date of Patent: Oct. 7, 2003

(54) STORAGE APPARATUS THAT ATTACHES TO A VEHICLE SEAT

(75) Inventor: Kent E. Johnston, Birmingham, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/966,705

(22) Filed: Sep. 27, 2001

(65) Prior Publication Data

US 2003/0057747 A1 Mar. 27, 2003

(51) Int. Cl.[7] .................................................. A47C 7/62
(52) U.S. Cl. ........................... 297/188.06; 297/188.04; 108/44; 211/149
(58) Field of Search ....................... 297/188.04, 188.06, 297/188.01; 211/88.01, 90.01, 104, 118, 149; 108/44

(56) References Cited

U.S. PATENT DOCUMENTS

| 915,618 | A | * | 3/1909 | Mattison ...................... 108/179 |
|---|---|---|---|---|
| 2,100,261 | A | * | 11/1937 | Montgomery ................ 224/275 |
| 2,267,861 | A | * | 12/1941 | Haley ............................ 297/163 |
| 2,474,943 | A | * | 7/1949 | Hedger ......................... 297/163 |
| 2,680,523 | A | | 6/1954 | Heeter |
| 2,687,336 | A | * | 8/1954 | Smith et al. ................. 297/163 |
| 2,720,436 | A | * | 10/1955 | Covey |
| 2,932,544 | A | * | 4/1960 | Lambert ....................... 297/163 |
| 4,443,034 | A | | 4/1984 | Beggs |
| 4,466,659 | A | * | 8/1984 | Carpentier et al. ..... 297/188.06 |
| 4,726,621 | A | * | 2/1988 | Müller ........................... 297/146 |
| 4,792,183 | A | * | 12/1988 | Townsend, III ............. 297/163 |
| 5,046,433 | A | | 9/1991 | Kramer et al. |
| 5,269,229 | A | | 12/1993 | Akapatangkul |
| 5,370,060 | A | | 12/1994 | Wang |
| 5,443,018 | A | | 8/1995 | Cromwell |
| 5,511,493 | A | * | 4/1996 | Kanehl, Jr. ................... 108/44 |
| 5,592,887 | A | * | 1/1997 | Teng ........................... 108/134 |
| 5,678,741 | A | | 10/1997 | Schieber |
| 5,738,230 | A | * | 4/1998 | Goldstein .................... 211/149 |
| 5,813,354 | A | | 9/1998 | Scott |
| 5,878,672 | A | * | 3/1999 | Ostermann et al. ........... 108/44 |
| 5,921,605 | A | | 7/1999 | Musukula et al. |
| 5,931,527 | A | | 8/1999 | D'Onofrio et al. |
| 5,967,054 | A | | 10/1999 | Rosenfeld |
| 6,105,839 | A | | 8/2000 | Bell |
| 6,279,800 | B1 | * | 8/2001 | Lee ............................. 224/276 |
| 6,502,900 | B1 | * | 1/2003 | Johnston ................. 297/188.06 |

* cited by examiner

*Primary Examiner*—Peter M. Cuomo
*Assistant Examiner*—Joseph Edell
(74) *Attorney, Agent, or Firm*—Myers Bigel Sibley & Sajovec

(57) ABSTRACT

A storage apparatus is provided that attaches to a vehicle seat backrest and that includes a frame and a pair of elongated panels pivotally secured to the frame in adjacent, vertically spaced-apart relationship, wherein each elongated panel is movable between an operative, generally horizontal, position and a stored, generally vertical position. The elongated panels may be in adjacent, face-to-face relationship when in respective stored positions. The elongated panels may be in adjacent, generally coplanar relationship when in respective stored positions.

9 Claims, 10 Drawing Sheets

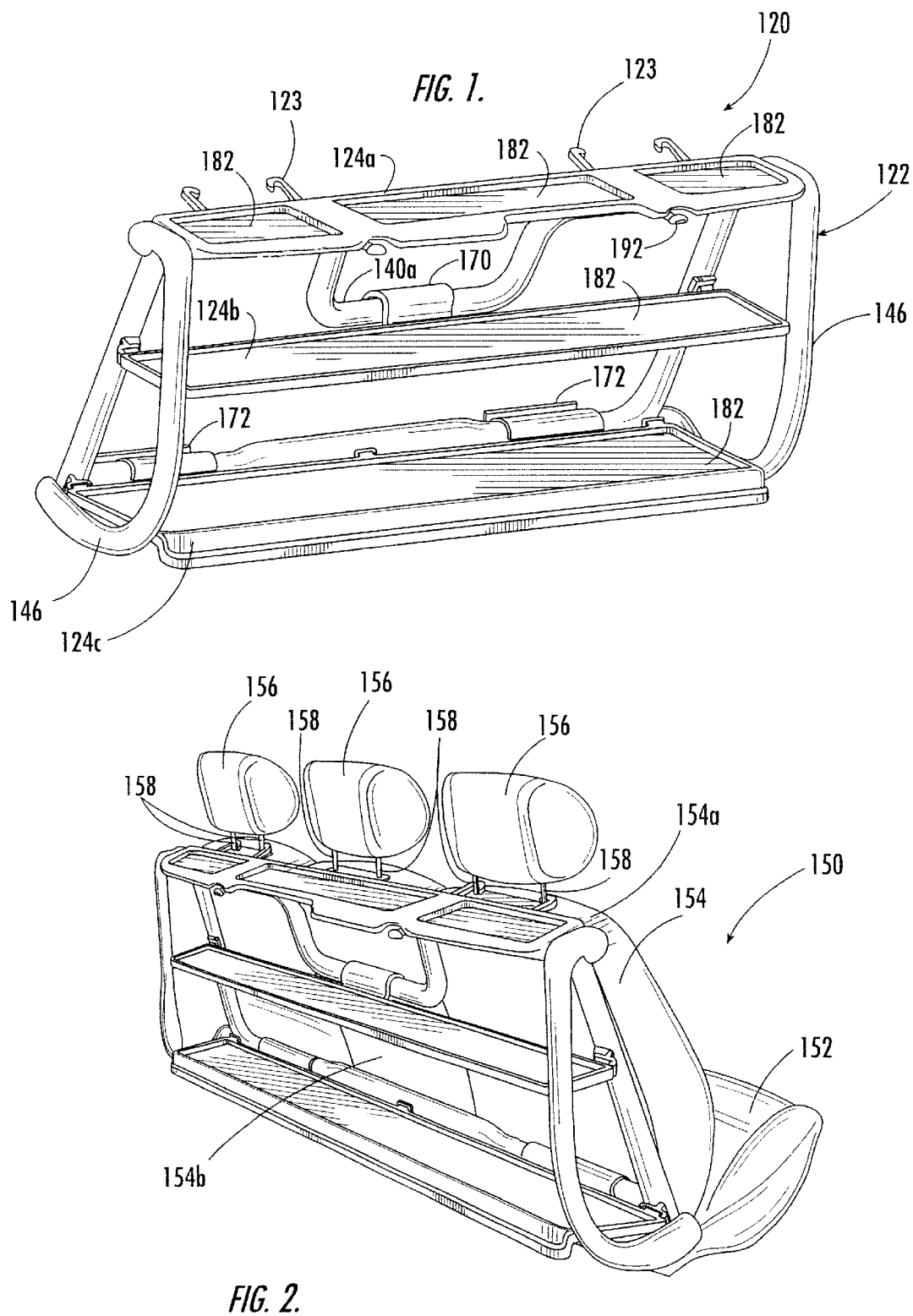

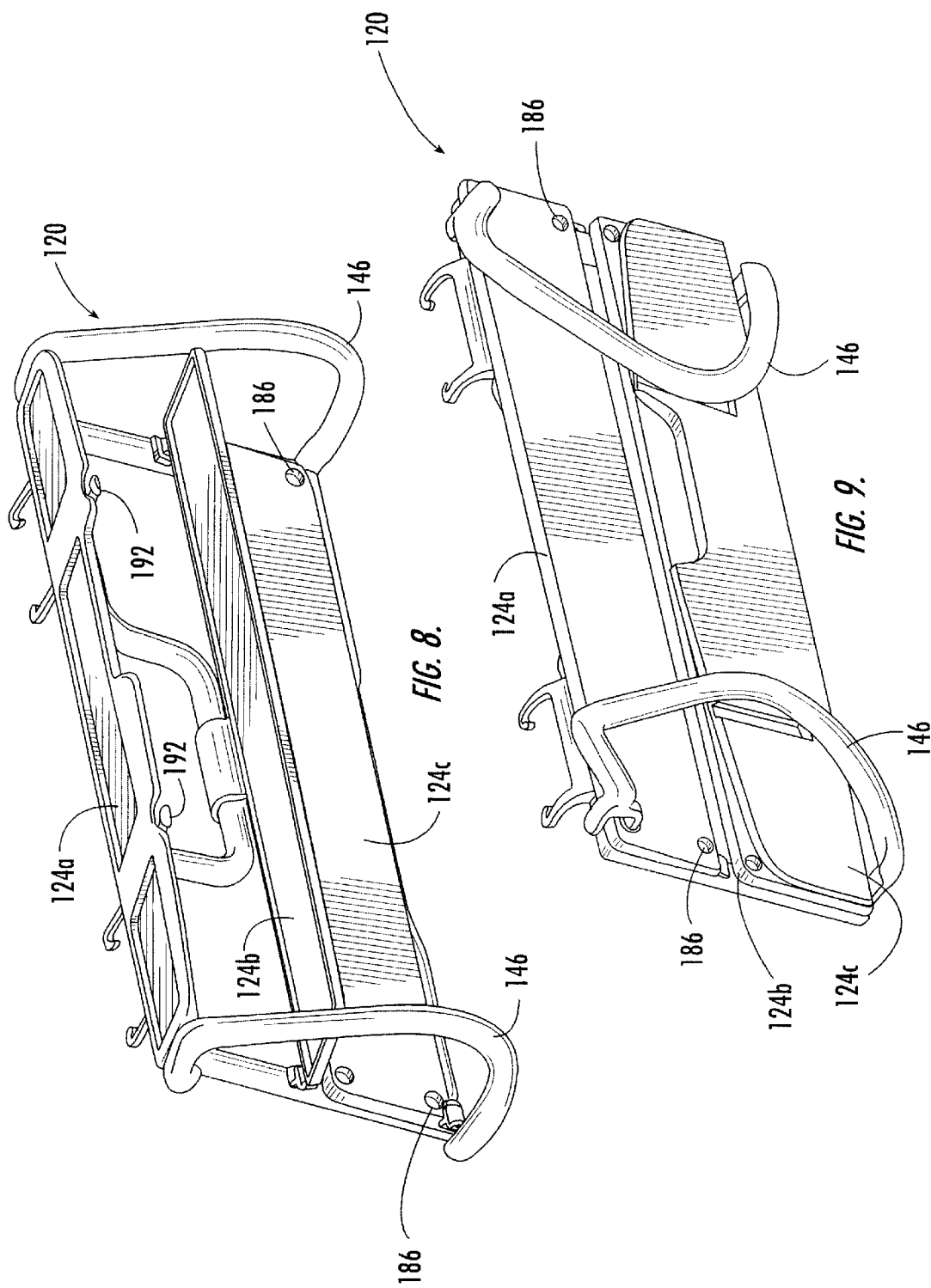

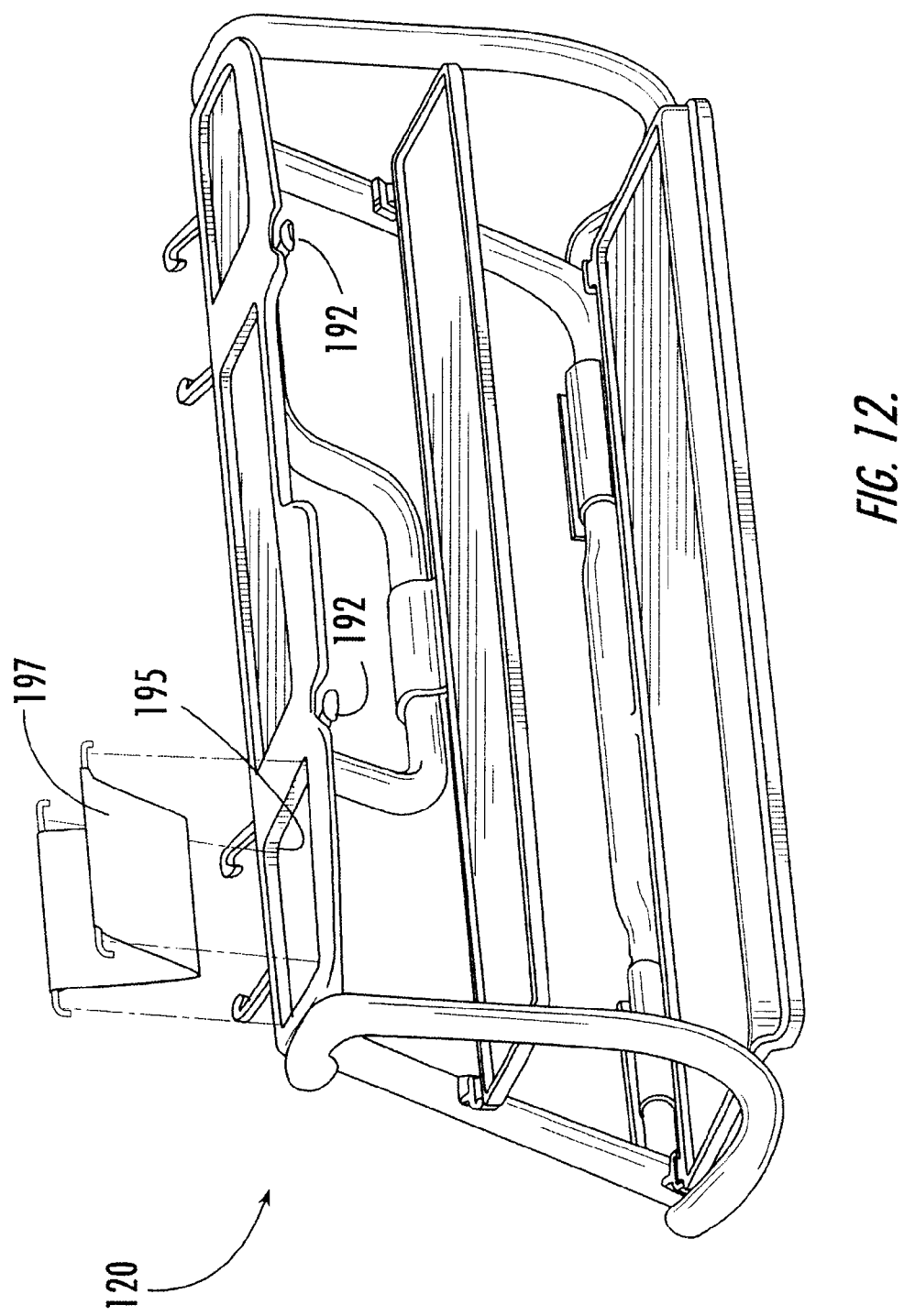

STORAGE APPARATUS THAT ATTACHES TO A VEHICLE SEAT

FIELD OF THE INVENTION

The present invention relates generally to vehicles and, more particularly, to cargo management apparatus for use within vehicles.

BACKGROUND OF THE INVENTION

In sport/utility and mini-van vehicles, generally there are two or more rows of seating. Conventionally, behind the last row of seating is a cargo storage area. Unfortunately, in automotive vehicles such as sport/utility vehicles and mini-vans, cargo storage space may be somewhat limited. Accordingly, a need exists to maximize the efficiency and utilization of existing cargo storage space without intruding on passenger space.

SUMMARY OF THE INVENTION

In view of the above discussion, a storage apparatus is provided that attaches to a vehicle seat backrest and that includes a frame and a pair of elongated panels pivotally secured to the frame in adjacent, vertically spaced-apart relationship, wherein each elongated panel is movable between an operative, generally horizontal, position and a stored, generally vertical position. The elongated panels may be in adjacent, face-to-face relationship when in respective stored positions. The elongated panels may be in adjacent, generally coplanar relationship when in respective stored positions.

According to additional embodiments of the present invention, a storage apparatus is provided that attaches to a vehicle seat backrest and that includes a frame and first, second, and third elongated panels pivotally secured to the frame in adjacent, vertically spaced-apart relationship. Each elongated panel is movable between an operative, generally horizontal, position and a stored, generally vertical position. The first and second elongated panels are in adjacent, generally coplanar relationship when in respective stored positions, and the second and third elongated panels are in adjacent, face-to-face relationship when in respective stored positions.

Apparatus according to embodiments of the present invention may be lightweight and are designed for quick and easy installation and removal. Moreover, apparatus according to embodiments of the present invention can be interchangeably installed within various different vehicles. Apparatus according to embodiments of the present invention can be inexpensive to manufacture and do not require special brackets and/or attachments, and do not require vehicle modifications. In addition, apparatus according to embodiments of the present invention are configured to be stored out of the way when not in use.

BRIEF DESCRIPTION OF THE DRAWINGS

FIG. 1 is a perspective view of a storage apparatus that is configured to be removably attached to a vehicle seat according to embodiments of the present invention.

FIG. 2 is a perspective view of a vehicle seat having the storage apparatus of FIG. 1 attached thereto according to embodiments of the present invention.

FIGS. 7–11 are perspective views of the storage apparatus of FIG. 1 illustrating the elongated panels in various configurations according to embodiments of the present invention.

FIG. 12 is a perspective view of the storage apparatus of FIG. 1 wherein the upper elongated panel is configured to have hanging folders suspended through an opening formed therein, according to embodiments of the present invention.

DETAILED DESCRIPTION OF THE INVENTION

Figure 3:
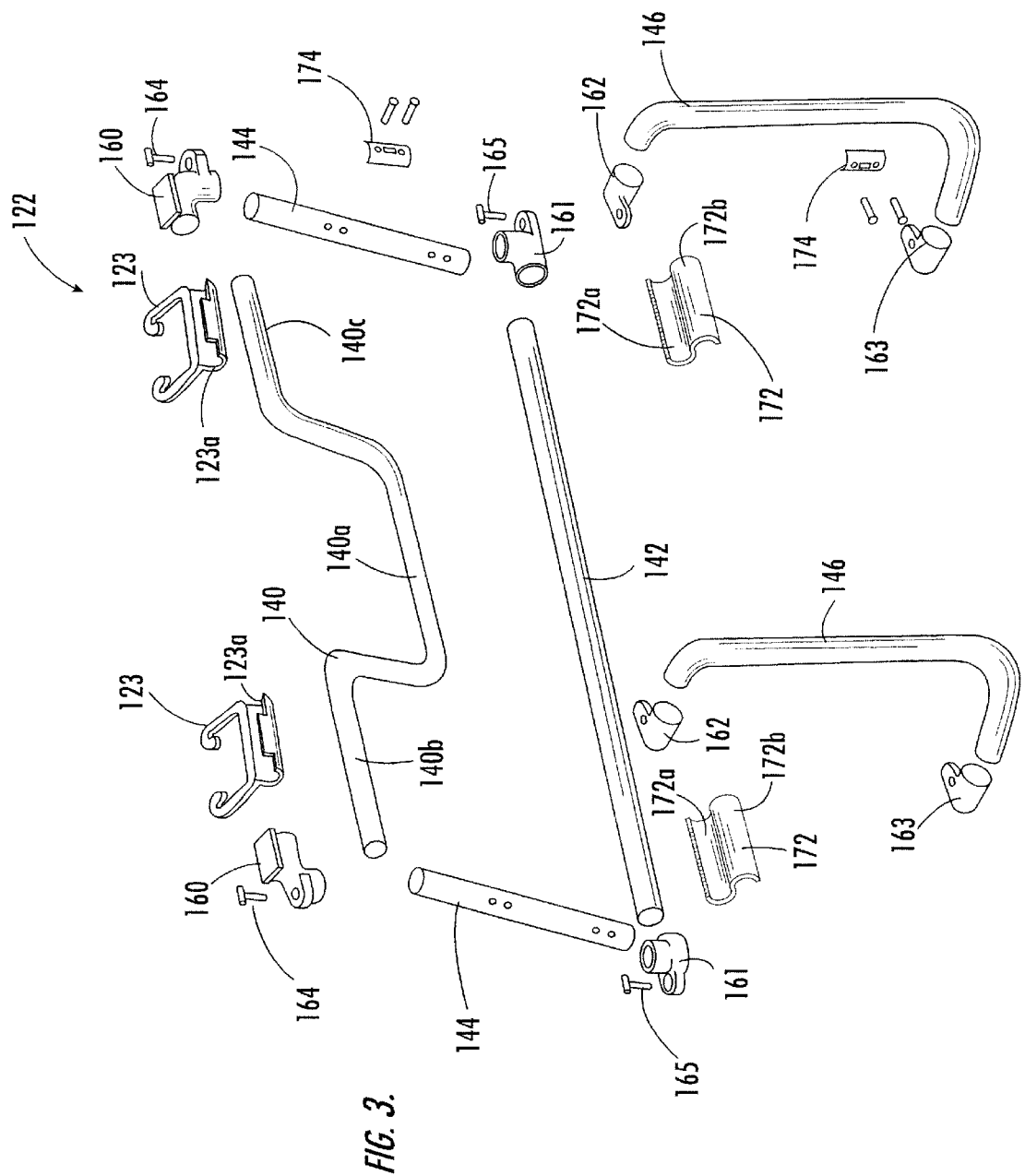
FIG. 3 is an exploded perspective view of the frame of the storage apparatus of FIG. 1 according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to FIG. 1, a storage apparatus 120 that is configured to be removably attached to a vehicle seat according to embodiments of the present invention, is illustrated. The illustrated storage apparatus 120 includes a frame 122 that is configured to be supported from one or more headrest support posts extending from a vehicle seat and a plurality of elongated panels 124a, 124b, 124c pivotally attached to the frame 122 in vertically spaced-apart relationship. The elongated panels 124a, 124b, 124c are movable between respective stored and operative positions. In an operative position, each elongated panel extends outwardly in a generally horizontal orientation and serves the function of a shelf such that articles can be stored thereon. The illustrated frame 122 is configured to be removably secured to a vehicle seat via hangers 123 that removably attach to headrest support posts.

Referring to FIG. 2, the storage apparatus 120 of FIG. 1 is illustrated in an installed configuration on a vehicle seat 150. The illustrated vehicle seat 150 includes a seat portion 152 and a backrest 154 attached to the seat portion 152. The backrest 154 may be pivotally attached to the seat portion 152 such that the backrest is movable between an upright, substantially vertical position (FIG. 2) and a folded, substantially horizontal position overlying the seat portion 152.

The illustrated backrest 154 includes a top portion 154a and a rear portion 154b. Headrests 156 are connected to the top portion 154a of the backrest 154 via respective support posts 158. Vehicle seats and headrests attached thereto are well understood by those skilled in the art, and need not be described further herein. Moreover, operations for pivoting a backrest portion of a vehicle seat between an upright position and a folded position are well understood by those skilled in the art, and will not be described further herein. Storage apparatus according to embodiments of the present invention may be utilized with any type of seat for use within any type of vehicle.

The illustrated storage apparatus 120 is secured to the rear portion 154b of the backrest 154 via the hangers 123 which are removably secured to the headrest support posts 158, and via connectors 172 attached to a lower cross member of the frame 122. Connectors 172 may be removably secured to the backrest 154 and/or seat portion 152 of the vehicle seat 150.

FIG. 3 is an exploded perspective view of the illustrated frame 122 according to an embodiment of the present invention. The illustrated frame 122 is formed from a plurality of tubular components and fittings. However, embodiments of the present invention are not limited to the illustrated frame configuration. A frame 122 according to embodiments of the present invention may be a single unitary structure or may be formed from various types and numbers of components, both tubular and/or non-tubular components.

The illustrated frame 122 includes an upper cross member 140, a lower cross member 142, opposite posts 144, and opposite side members 146. The upper cross member 140 is attached to each post 144 via respective upper corner members 160. The lower cross member 142 is attached to each post via respective lower corner members 161. The upper cross member 140, lower cross member 142, and posts 144 may be secured to the respective upper and lower corner members 160, 161 in any of various known ways (e.g., threads, adhesives, etc.). Ways of connecting tubular components and fittings are well known in the art and need not be described herein.

The side members 146 are pivotally secured to respective upper and lower corner members 160, 161 via respective upper and lower connectors 162, 163. Each upper connector 162 is pivotally attached to a respective upper corner member 160 via pin 164. Each lower connector 163 is pivotally attached to a respective lower corner member 161 via pin 165. The side members 146 are configured to support each of the elongated panels 124a, 124b, 124c in respective operative positions. The illustrated side members 146 have arcuate configurations and bow outwardly away from the rear portion of a seat backrest when in the operative position. The side members 146 are configured to pivot between a stored position and an operative position. As illustrated in FIG. 9, the side members 146 may bow towards each other when in the stored position. However, the side members 146 may also be configured to bow away from each other when in the stored configuration according to other embodiments of the present invention.

The illustrated upper cross member 140 includes an intermediate portion 140a having a U-shaped configuration. The middle elongated panel 124b is pivotally secured to the upper cross member 140 at the intermediate portion 140a via connector 170, as illustrated in FIG. 1.

The illustrated headrest support post hangers 123 include a U-shaped portion 123a that is configured to be removably secured to respective end portions 140b, 140c of the upper cross member 140. Headrest support post hangers utilized in conjunction with embodiments of the present invention may have various configurations and are not limited to the illustrated embodiment.

The illustrated lower cross member 142 is configured to be secured to a vehicle seat via connectors 172. Connectors 172 include a U-shaped portion 172a that is configured to be removably secured to the lower cross member 142. Opposite end portions 172b of connectors 172 are configured to be attached to either the backrest portion or seat portion of a vehicle seat.

A plurality of panel support members 174 are attached to respective portions of the frame 122 for supporting the elongated panels 124a, 124b, 124c. Panel support members 174 may be attached to the frame in various ways including, but not limited to, fasteners (e.g., rivets, bolts, screws, etc.) and adhesives. Panel support members 174 may also be integrally formed with the frame 122.

Figure 4:
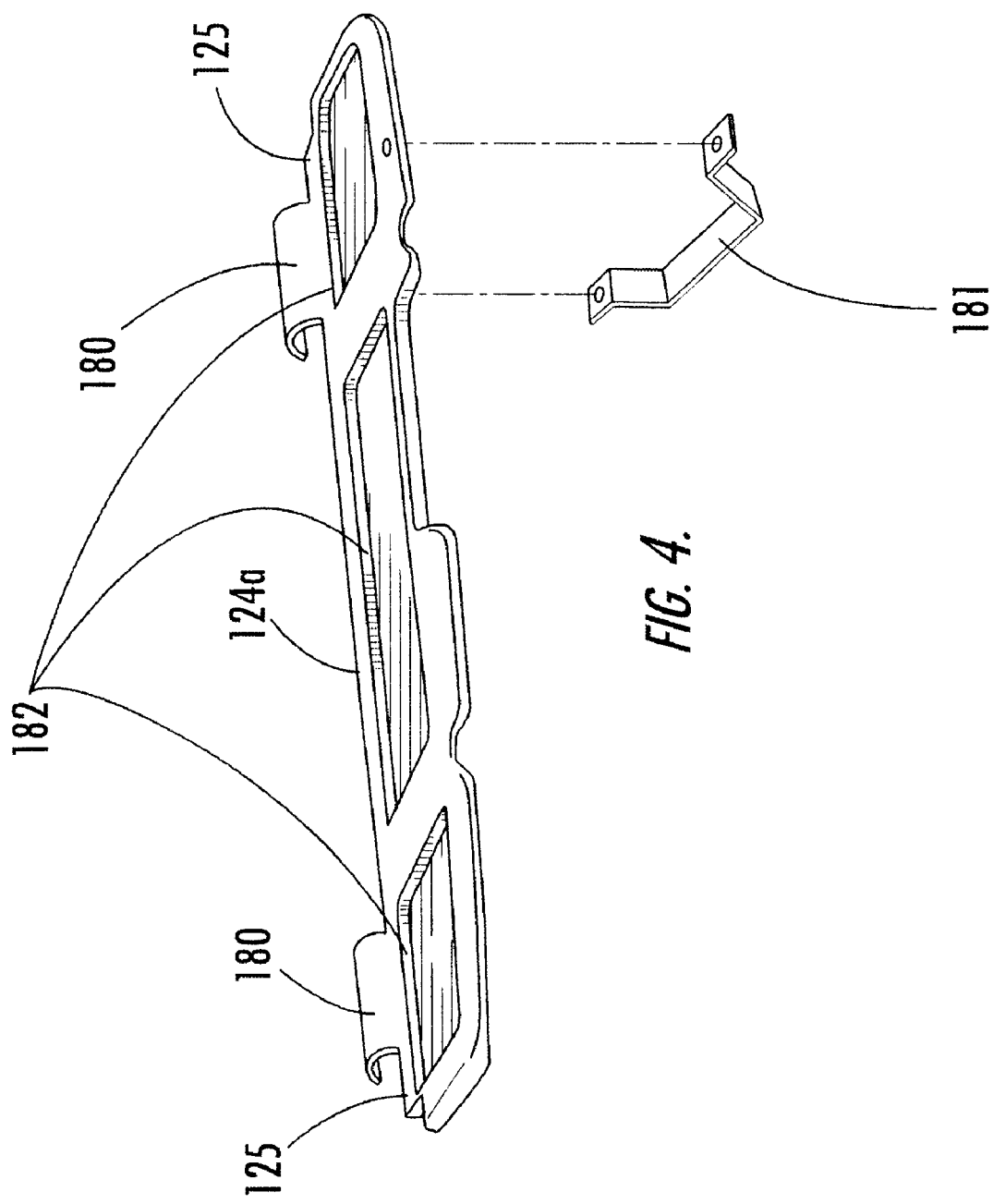
FIG. 4 is a perspective view of the upper elongated panel according to embodiments of the present invention.
Figure 5A:
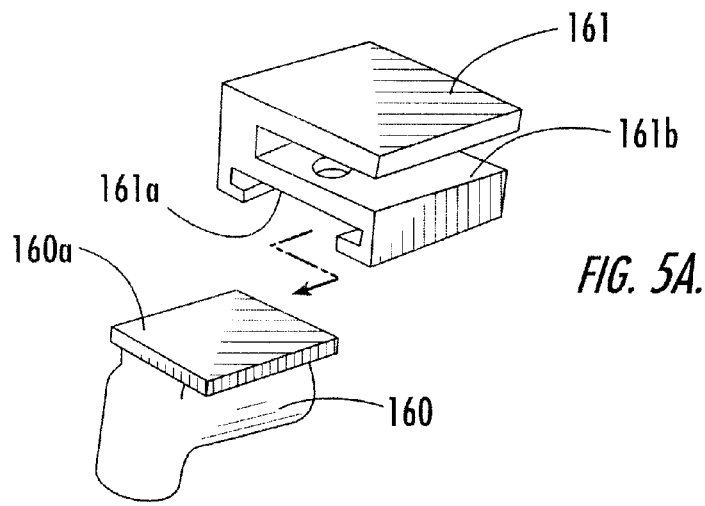
FIG. 5A is an exploded perspective view of connectors utilized to secure a corner of the upper elongated panel to the frame, according to embodiments of the present invention.
Figure 5B:
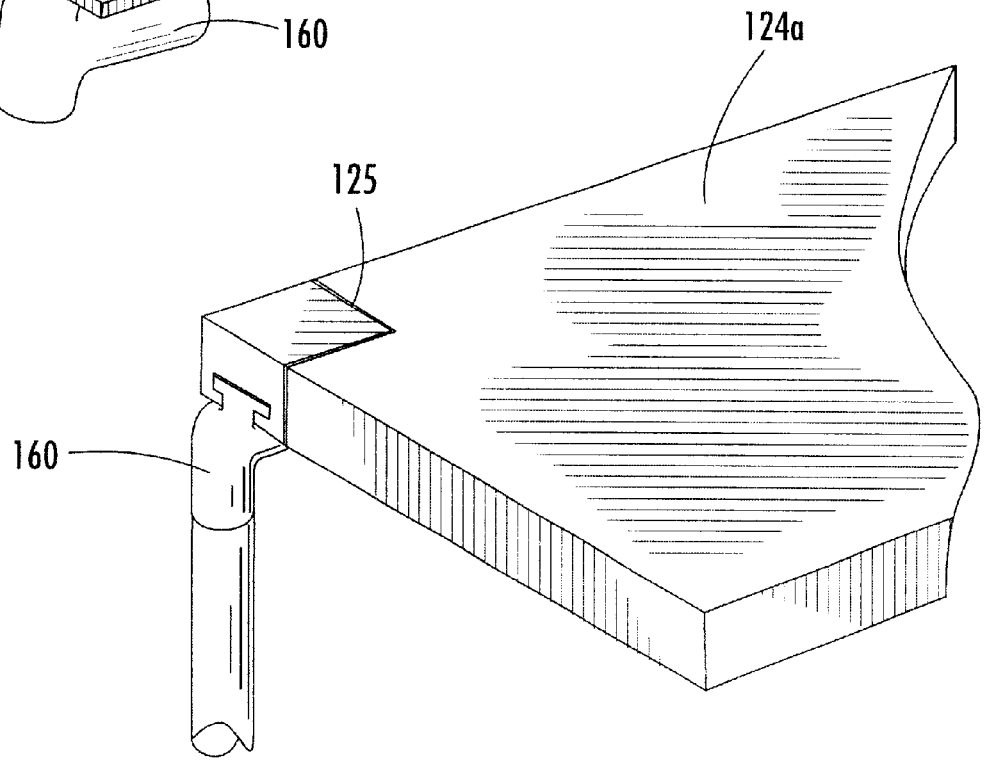
FIG. 5B is a partial perspective view of a corner of the upper elongated panel illustrating the upper elongated panel attached to the frame.

Referring to FIG. 4 and FIGS. 5A–5B, the upper (or first) elongated panel 124a is illustrated in greater detail. The illustrated upper elongated panel includes support members 180 that are configured to removably and pivotally secure the upper elongated panel 124a to the upper cross member 140. Corner portions 125 of the illustrated upper elongated panel 124a are configured to be secured to the respective upper corner members 160, as illustrated in FIGS. 5A–5B. Each upper corner member 160 includes a T-shaped portion 160a that is configured to slidably engage with a correspondingly-shaped passageway 161a in member 161. Member 161 also includes slot 161b that is configured to receive corner portion 125. To allow the upper elongated panel 124a to pivot from the operative position to a stored position, the corners 125 of the upper elongated panel 124a are slidably disengaged from the upper corner members 160. The upper elongated panel 124a can then pivot via support members 180 to a stored position.

One or more garment hangers 181 may be secured to an underside portion of the upper panel 124a, as illustrated in FIG. 4. In addition, one or more recessed portions 182 may be formed within the upper elongated panel 124a that serve as receptacles for receiving and storing items therein. An upper elongated panel, according to embodiments of the present invention, may also include one or more cup holders formed therein and/or extending therefrom. An upper elongated panel, according to embodiments of the present invention, may also include one or more apertures 186 configured to retain a cargo net (not shown) used to cover all or portions of one or more of the elongated panels 124a, 124b, 124c.

Figure 6:
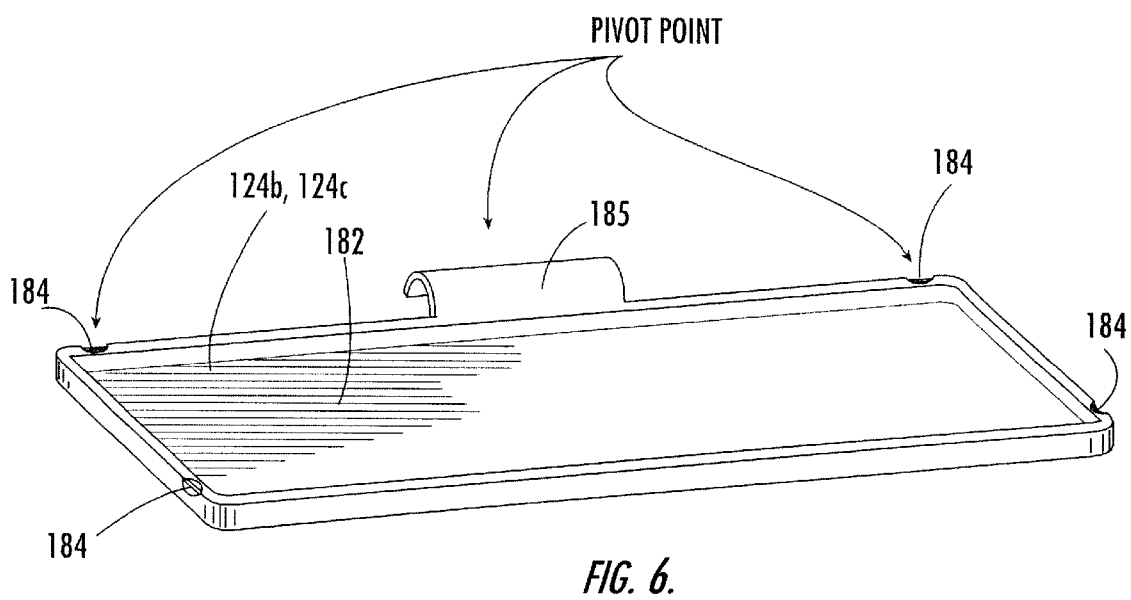
FIG. 6 is a perspective view of an elongated panel that may be utilized as the middle and/or lower elongated panel according to embodiments of the present invention.

Referring to FIG. 6, an elongated panel that is representative of the middle (or second) elongated panel 124b and the lower (or third) elongated panel 124c is illustrated. The illustrated elongated panel 124b, 124c includes a plurality of apertures 184 formed therein that are configured to engage with respective panel support members 174 attached to the frame 122. The apertures 184 serve as support/pivot points that allow an elongated panel to be secured to the frame 122 and that allow pivotal movement of an elongated panel with respect to the frame 122. The illustrated elongated panel 124b, 124c also includes a connector 185 that is configured to removably and pivotally secure the elongated panel 124b, 124c to the frame 122. According to embodiments of the present invention, one or more recessed portions 182 may be formed within the middle and lower elongated panels 124b, 124c which serve as receptacles for receiving and storing items therein. The middle and lower elongated panels 124b, 124c, according to embodiments of the present invention, may also include one or more cup holders formed therein and/or extending therefrom. The middle and lower elongated panels 124b, 124c, according to embodiments of the present invention, may also include one or more apertures 186 configured to retain a cargo net (not shown) used to cover all or portions of one or more of the elongated panels 124a, 124b, 124c.

Figure 7:
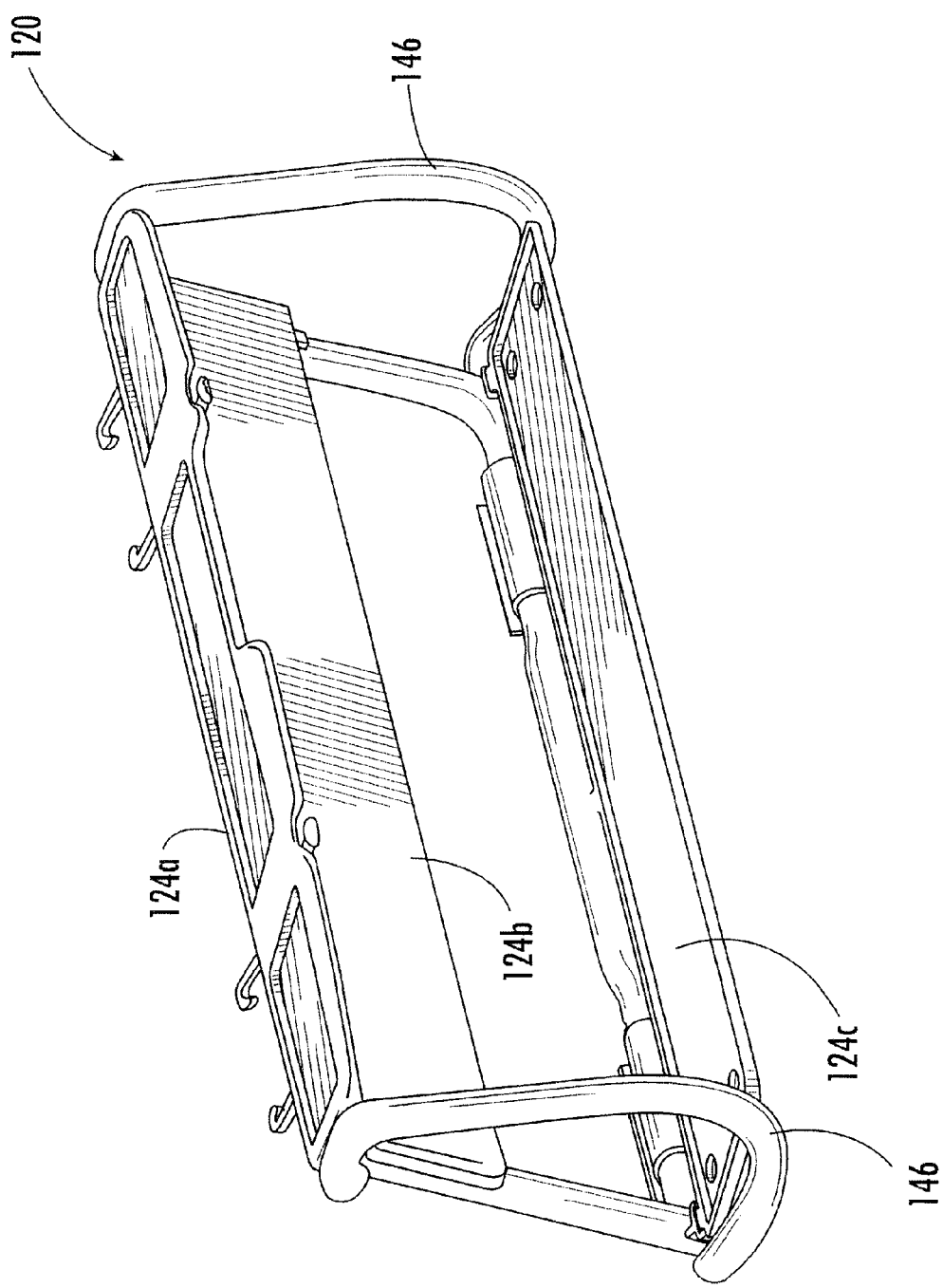

Referring now to FIGS. 7–10, the elongated panels 124a, 124b, 124c of the storage apparatus 120 of FIG. 1 are illustrated in various configurations. In FIG. 7, the middle elongated panel 124b is in a stored position and the upper and lower elongated panels 124a, 124c are in operative positions. In FIG. 8, the lower elongated panel 124c is in a stored position and the upper and middle elongated panels 124a, 124b are in operative positions. In FIG. 9, all three elongated panels 124a, 124b, 124c are in stored positions and the side members 146 are pivoted to respective stored positions, as illustrated. When in respective stored positions, the second and third elongated panels 124b, 124c are in adjacent, face-to-face relationship, as illustrated in FIG. 9.

Preferably, the elongated panels 124a, 124b, 124c are releasably secured to the frame 122 and restrained from pivotal movement when in respective stored positions. Various ways of releasably securing the elongated panels 124a, 124b, 124c to the frame 122 may be utilized without limitation (e.g., fasteners, clamps, adhesives, hook and loop fasteners, etc.).

Figure 10:
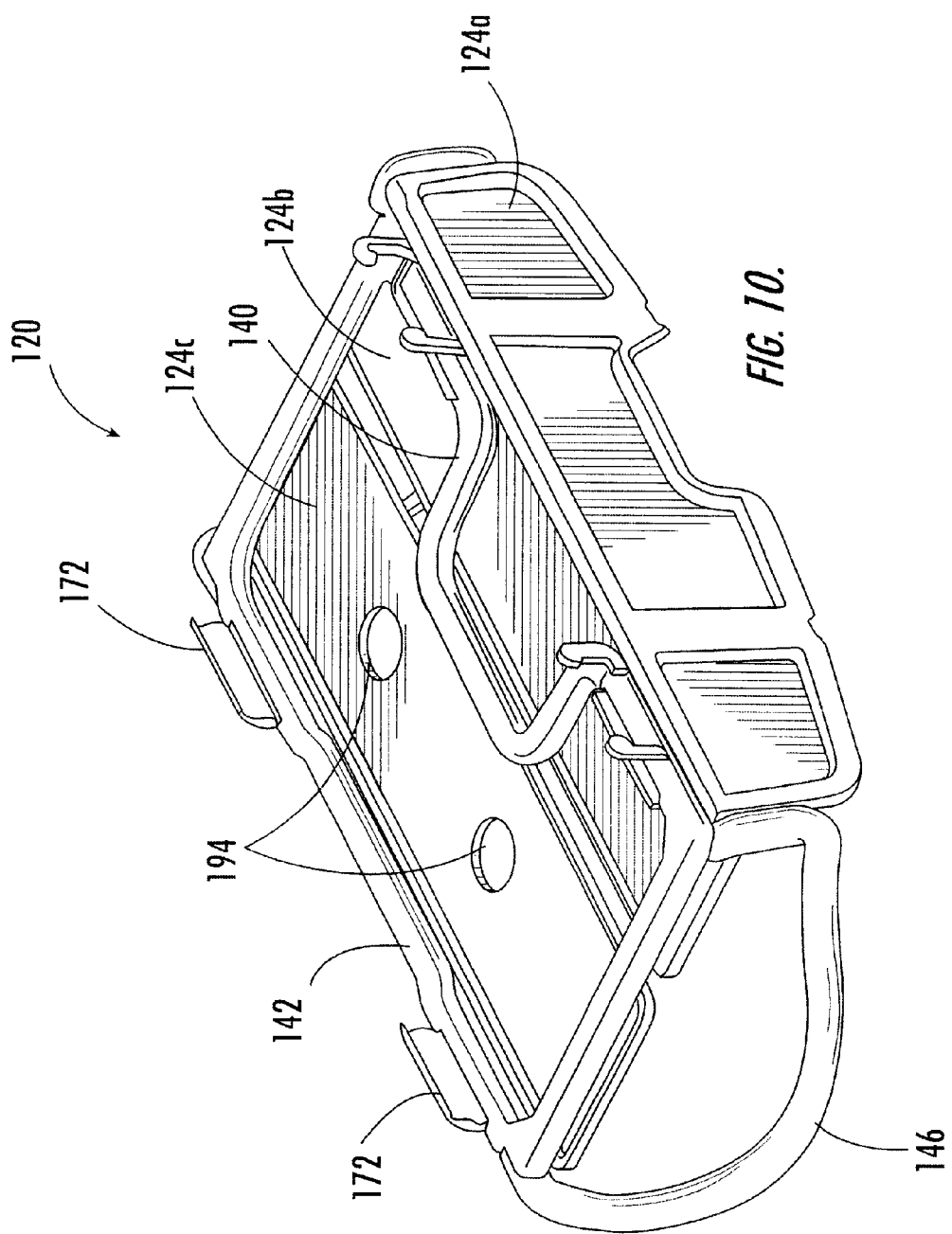

In FIG. 10, the storage apparatus 120 is illustrated in a "table" configuration for use outside of a vehicle. The middle and lower elongated panels 124b, 124c are in respective stored positions such that they are in adjacent, generally coplanar relationship. The first elongated panel 124a is in an operative position and serves as a leg support for the "table." The side members 146 are in operative positions and also serve as leg supports for the table. Cup holders 194 may be provided in one or more of the elongated panels 124b, 124c.

According to embodiments of the present invention, the storage apparatus 120 of FIG. 1 may serve the function of a table when the backrest 154 to which the storage apparatus 120 is attached is in a folded position and when one or more of the elongated panels 124a, 124b, 124c are in stored positions. Accordingly, the storage apparatus 120 may serve as a table, both inside and outside of a vehicle.

Figure 11:
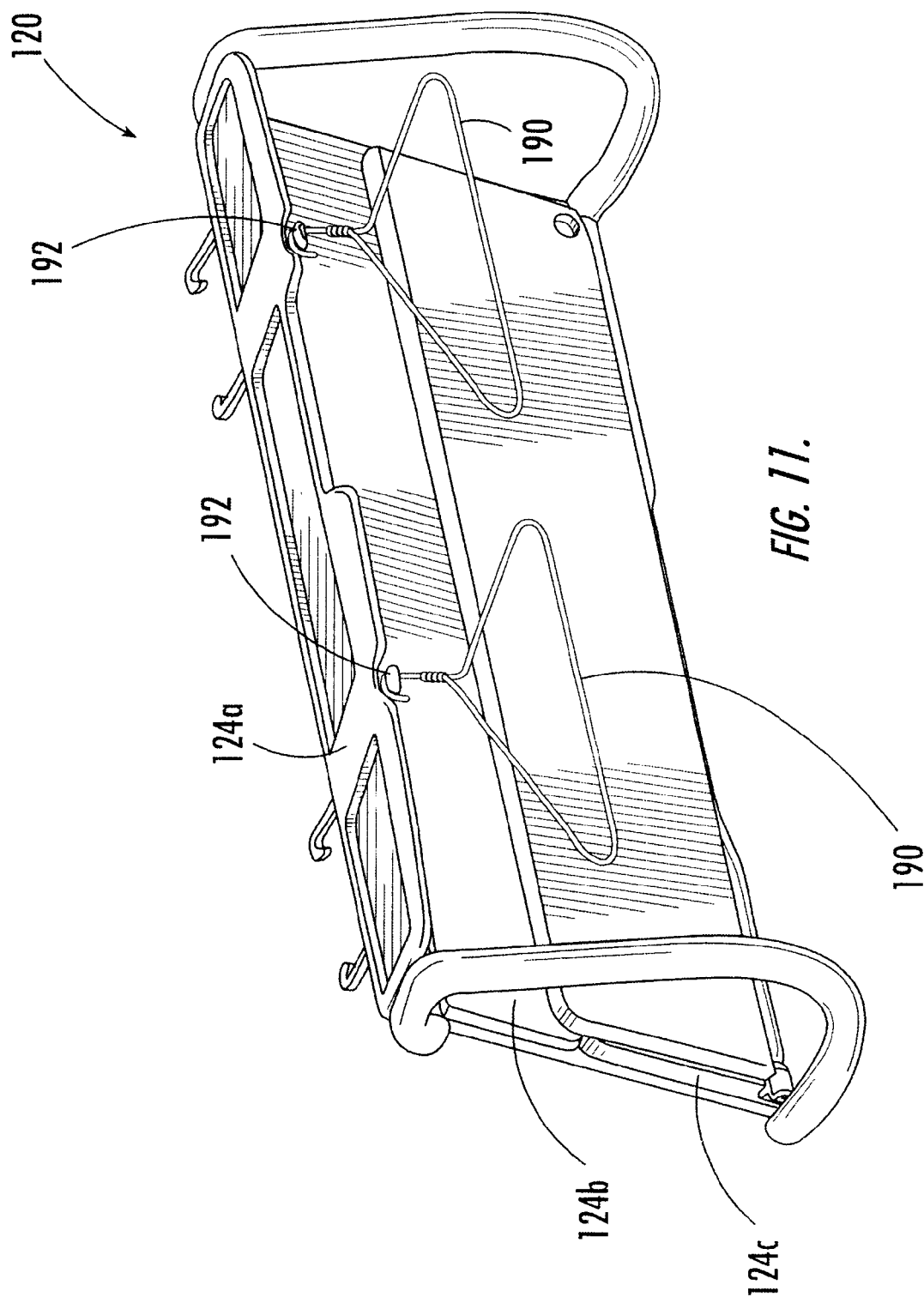

In FIG. 11, a pair of clothes hangers 190 are supported from projections 192 extending from the upper elongated panel 124a. Projections for supporting various articles (e.g., clothes hangers, grocery bags, etc.) may have various configurations and may also extend from various locations on the frame 122 as well as from one or more of the other elongated panels 124b, 124c.

According to embodiments of the present invention illustrated in FIG. 12, the upper elongated panel 124a may include an opening 195 through which hanging folders 197 can be suspended when the upper elongated panel 124a is in the operative position. The middle and lower elongated panels 124b, 124c may also include openings for receiving hanging folders.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A storage apparatus that attaches to a vehicle seat, wherein the vehicle seat includes a seat portion and a backrest, the storage apparatus comprising:
   a frame configured to be removably secured to a rear portion of the backrest, comprising:
      a generally horizontal upper cross member comprising a U-shaped intermediate portion;
      a generally horizontal lower cross member spaced apart from the upper cross member;
      a pair of spaced-apart side members pivotally secured to the upper and lower cross members; and
   first, second and third elongated panels pivotally secured to the frame in adjacent, vertically spaced-apart relationship, wherein each elongated panel is movable between a generally horizontal operative position and a generally vertical stored position, wherein the first panel is pivotally secured to the upper cross member, wherein the second panel is pivotally secured to the lower cross member, wherein the third panel is pivotally secured to the upper cross member at the U-shaped intermediate portion, and wherein the panels are maintained in respective operative positions by the side members.

2. The storage apparatus of claim 1, wherein the backrest includes a top portion and one or more headrests connected to the top portion via one or more respective support posts, and wherein the frame comprises one or more hangers configured to removably attach the frame to the one or more headrest support posts of a respective headrest.

3. The storage apparatus of claim 2, wherein each hanger is configured to be removably secured to the upper cross member.

4. The storage apparatus of claim 3, wherein the side members have an arcuate configuration and are configured to pivot between a stored position and an operative position, wherein the side members are substantially co-planar when in the stored position, and wherein the side members are substantially parallel when in the operative position.

5. The storage apparatus of claim 1, wherein at least one of the elongated panels comprises one or more cup holders.

6. The storage apparatus of claim 1, wherein the frame comprises at least one projection extending therefrom that is configured to support articles suspended therefrom.

7. The storage apparatus of claim 1, wherein at least one of the elongated panels comprises at least one projection extending therefrom that is configured to support articles suspended therefrom.

8. The storage apparatus of claim 1, wherein one of the elongated panels comprises an opening formed therethrough and wherein the storage apparatus further comprises one or more hanging folders suspended from the elongated panel through the opening.

9. The storage apparatus of claim 1, wherein the elongated panels, when in the stored position, are releasably secured to the frame and restrained from pivotal movement relative thereto.

* * * * *